United States Patent [19]
Gerhard

[11] Patent Number: 5,112,174
[45] Date of Patent: May 12, 1992

[54] EXPANDING PLUG

[75] Inventor: Anton Gerhard, Nuremberg, Fed. Rep. of Germany

[73] Assignee: "Toge-Dubel" A Gerhard GmbH, Nuremberg, Fed. Rep. of Germany

[21] Appl. No.: 698,050

[22] Filed: May 10, 1991

Related U.S. Application Data

[63] Continuation-in-part of Ser. No. 599,197, Oct. 17, 1990, abandoned.

[30] Foreign Application Priority Data

Oct. 17, 1989 [DE] Fed. Rep. of Germany ....... 3934534

[51] Int. Cl.⁵ .............................................. F16B 13/06
[52] U.S. Cl. ......................................... 411/53; 411/55
[58] Field of Search .................. 411/53, 28, 60, 55, 411/44, 61, 45, 46, 57, 48, 49, 50, 51, 27

[56] References Cited

U.S. PATENT DOCUMENTS

| | | | |
|---|---|---|---|
| 777,399 | 12/1904 | Church | 411/60 X |
| 1,041,953 | 10/1912 | Bennett | 411/53 |
| 1,101,302 | 6/1914 | Masor | 411/53 |
| 1,365,945 | 1/1921 | Ogden | 411/28 |
| 1,434,394 | 11/1922 | Matthes | 411/53 |
| 4,390,042 | 6/1983 | Kucherer et al. | 411/72 X |
| 4,602,902 | 7/1986 | Herb | 411/60 X |

FOREIGN PATENT DOCUMENTS

| | | | |
|---|---|---|---|
| 2711845 | 9/1978 | Fed. Rep. of Germany | . |
| 2904988 | 9/1980 | Fed. Rep. of Germany | 411/57 |
| 2909309 | 9/1980 | Fed. Rep. of Germany | 411/57 |
| 3145319 | 5/1983 | Fed. Rep. of Germany | . |
| 3601598 | 7/1987 | Fed. Rep. of Germany | 411/55 |
| 474684 | 8/1969 | Switzerland | 411/44 |
| 137806 | 9/1920 | United Kingdom | 411/55 |

Primary Examiner—Rodney M. Lindsey
Attorney, Agent, or Firm—Browdy and Neimark

[57] ABSTRACT

An expanding plug in usual manner comprises an expanding sleeve, an expanding screw and an expanding cone which serves to expand the expanding sleeve and which can be pulled into the expanding sleeve by means of the expanding screw. So as to reduce the material need for the expanding cone and the manufacturing expenditure, the expanding cone is bent from sheet. Its edges of its wall limiting a joint gap are positively connected with each other by means of an interlocking in the direction of the central longitudinal axis and tangentially to the latter or by welding.

26 Claims, 2 Drawing Sheets

EXPANDING PLUG

This is a continuation-in-part of application Ser. No. 07/599,197 filed Oct. 17, 1990, now abandoned without prejudice in favor or the present application.

FIELD OF THE INVENTION

The invention relates to an expanding plug comprising an expanding sleeve provided with at least one slot over at least part of its length, an expanding screw arranged in the expanding sleeve concentrically to a common central longitudinal axis and bearing against the expanding sleeve with a head on a rim of the latter, and an expanding cone held safe from twisting relative to the expanding sleeve at a plug-in end of the expanding sleeve opposite the rim and axially slidable in the expanding sleeve, which expanding cone has an internal thread to take up an external thread of the expanding screw and an expanding section, which is a frusto-conical section, for expanding the area of the expanding sleeve associated with the plug-in end when this expanding section is pulled into the expanding sleeve by means of the expanding screw.

BACKGROUND OF THE INVENTION

In an expanding plug of this type known from German published patent application 31 45 319 the expanding cone consists of zinc die casting. Such expanding cones of die casting are comparatively heavy and having a correspondingly high material need. Technically these expanding cones are satisfying and have, therefore, been generally accepted in practice.

Of course the expanding cones are known to be made of plastics material without any substantial change in shape; but these cones have not been generally accepted, since the shear strength of the internal thread for the expanding screw is not sufficiently high.

A plug is already known from German published patent application 27 11 845 which consists of several external clamping jaws, in which a plug nucleus provided with projections is arranged to expand these clamping jaws. Without being specific this prior publication explains that this plug nucleus, too, might consist of a cylindrically rolled sheet with correspondingly punched-out recesses. Further hints cannot be taken from this publication.

SUMMARY OF THE INVENTION

It is accordingly the object of the invention to embody an expanding plug of the generic kind of which the material expenditure for the expanding cone is less than for an expanding cone of zinc die casting with an at least equally high stability of the internal thread.

This object is attained in accordance with the invention by the expanding cone being formed from metal sheet and by the edges of its wall limiting a joint gap being tightly connected with one another in the direction of and tangentially to the central longitudinal axis. Since the expanding cone is made of metal sheet, it is of comparatively little volume compared with a massive expanding cone of zinc die casting. It may also be manufactured of steel sheet. Nevertheless its weight is lower. Furthermore, steel is considerably less expensive than zinc so that the reduction of costs is particularly important. Moreover, the stability of steel is considerably higher than that of zinc. By means of the connection in the vicinity of the joint gap it is ensured that a distorsion of the expanding cone or a sliding one on top of the other of the wall sections of the expanding cone at the joint gap is avoided.

In particular the measures of positively connecting with each other the edges by means of an interlocking and the development of the interlocking being formed by a projection associated with an edge and positively engaging with a cut-out recess asociated with another edge, serve to achieve that on the one hand the expanding cone can be made in a single punching and stamping procedure and a subsequent bending procedure, with the connection in the vicinity of the joint gap being produced at the same time.

As a result of a further development consisting in that the internal thread is arranged in the vicinity of the interlocking it is achieved that the thread which is also produced in a chipless manner prior to the bending of the expanding cone cannot unfit for use by distorsion, since it is located in the area which is completely rigid in itself due to the interlocking.

The further development according to which the inner thread extends only over a part of the circumference of the expanding cone while the areas of the edges limiting the joint gap are provided without any thread ensures that the internal thread does not become unserviceable due to inaccuracies in alignment in the vicinity of the joint gap. The further development consisting in that the inner thread does not extend over the interlocking serves to this effect, too, and in addition results in that the projection serving for locking is not deformed after punching when the internal thread is stamped, whereby the positive precision of the interlocking might be adversely affected.

The measures according to which the internal thread is provided in a narrowing of the wall of the expanding cone and the narrowing approximately extends over the circumference of the internal thread result in that the internal thread can be chiplessly formed out of the inner wall of the expanding cone by stamping.

By the measure of the expanding cone having, apart from the expanding section, which is a frusto-conical section, a cylindrical section which is contiguous to the latter and where the interlocking is provided, it is ensured that the expanding section exposed to high radial forces is not simultaneously the place of interlocking. The steps consisting in that an abutment protruding from one of the edges limiting the joint gap into a slot of the expanding sleeve and serving as a safety device to prevent the latter from twisting is bent radially outwards in relation to the central longitudinal axis and in that the abutment is arranged between the expanding sleeve and the expanding cone behind at least one projection protruding into the slot and provided on the expanding sleeve to form a safety device preventing loss indicate measures by means of which a safety device to prevent twisting and a safety device to prevent loss are created in each case in relation to the expanding sleeve without any significant additional expenditure being applied to the expanding cone consisting of metal sheet. A further design of the expanding cone consists in that tongues are provided at the free end of the expanding section (frusto-conical section) which are bent radially inwards towards the central longitudinal axis and which limit a centering opening for the expanding screw.

As a result of the further development, according to which, in the vicinity of a cylindrical section receiving the internal thread, flaps are deflected radially relative to the axis outwards from both edges defining the joint gap, which flaps are connected with each other at a joint to form an abutment projecting into a slot of the expanding sleeve and serving as a safety device to prevent any twisting relative to the latter, an abutment is formed on the one hand serving as a safety device to prevent twisting, the two flaps of which it is formed simultaneously being tightly connected with each other, i.e. in particular by butt welding. The cone is thus safely protected from a distorsion or a displacement of the wall areas one into the other.

As a result of the development, according to which a tapered section is formed between the free end of the cylindrical section and the internal thread, the thread root of the internal thread lying within the approximately cylindrical inner surface of the tapered section, it is achieved that the cylindrical section is not deformed outside and that nevertheless the internal thread can be fitted into the cylindrical section.

The further development, according to which the abutment extends over at least part of the length of the tapered section and the internal thread, ensures that the cylindrical section exhibits a high rigidity of its own also in the area of the internal thread, so that the threads of the internal thread are in alignment also at their joint.

Further features, advantages and details of the invention will become apparent from the ensuing description of two examples of embodiment taken in conjunction with the drawings.

DESCRIPTION OF THE PREFERRED EMBODIMENT

Figure 1:
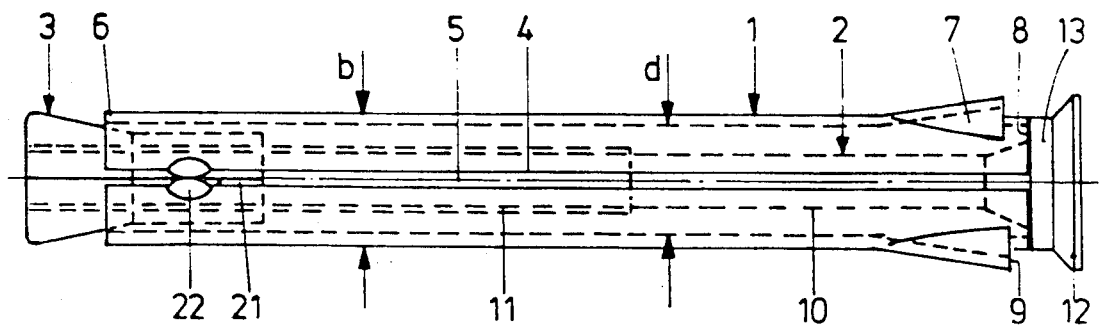
FIG. 1 is a longitudinal top view of an expanding plug comprising an expanding sleeve, an expanding screw and an expanding cone.

The exapnding plug shown in FIG. 1 comprises three parts, namely an expanding sleeve 1, an expanding screw 2 and an expanding cone 3. The expanding sleeve 1 and the expanding screw 2 are of usual design.

The expanding sleeve 1 is cylindrical and bent from metal sheet. It has a slot 4 extending over the full length of the sleeve 1 and running parallel to the central longitudinal axis 5. Furthermore, it has one or several additional slots not shown in the drawing at least in the vicinity of its plug-in end 6, i.e. where the expanding cone 3 is located. One or several slots may further be provided in the vicinity of the end opposite the plug-in end 6. Several projections 7 formed out of the expanding sleeve are situated there, too, and may serve to anchor the expanding sleeve in brickwork, concrete or the like, or their front surfaces facing the adjacent rim 8 of the sleeve 1 serve as bearing surfaces 9 for objects to be secured to brickwork, concrete or the like, such as metal frames or the like, in particular window frames or door frames.

The expanding screw 2 has a cylindrical bolt 10 provided at least over part of its length with an external thread 11 to be screwed into the expanding cone 3. The screw 2 further has a head 12 which is provided with a ring collar 13 facing the bolt 10 and bearing against the rim 8 of the sleeve 1, so that a precisely located bearing of the head 12 of the screw 2 against the sleeve 1 is achieved. When the expanding screw 2 is tightened the expanding cone is thus pulled into the plug-in end 6 of the sleeve 1 and expands the latter. To the extent the expanding plug has been described so far, it is generally known and accepted in practice.

The expanding cone 3 is also preferably bent from steel sheet, i.e. it has a wall 14 of which the thickness a is approximately the same all over and amounts to 5 to 10%, preferably 7 to 9%, of the outer diameter b of the expanding sleeve 1.

The cone 3 has a cylindrical section 15, of which the outer diameter c is a little smaller than the inner diameter d of the expanding sleeve 1. The difference between these two diameters c and d is to amount to one to a few tenths of a millimeter at maximum, so as to allow for an introduction of this cylindrical section 15 when the cone 3 is mounted in the sleeve 1 from the plug-in end. There sould be no unnecessary clearance. The cylindrical section 15 is followed by a cone-shaped, i.e. frusto-conical section 16, of which the outer diameter widens starting from the outer diameter c of the cylindrical section 15 to an outer diameter e, which approximately equals the outer diameter b of the sleeve 1, but is not larger than it, so that the expanding cone 3 does not radially protrude from the sleeve 1 when the latter is not expanded. The frusto-conical section 16 is also an expanding section of the expanding cone 3. Since the expanding cone 3 is bent from metal sheet, it has a joint gap 17 limited or formed, respectively, by two edges 18, 19 of the wall 14. In the vicinity of the free end 20 of the cylindrical section 15 a tang or a flag is bent outwards radially to the axis 5, whereby an abutment 21 is formed. When the cone 3 is mounted in the sleeve 1, this abutment 21 is introduced into the slot 4 or into one of the other slots mentioned and slid over at least one projection 22 produced by local crimping from the material of the sleeve 1 and extending into the slot 4. When the cone 3 is mounted, but the sleeve has not yet been expanded, this projection 22 is located—as shown in FIG. 1—on the side of the at least one projection 22 facing away from the plug-in end 6, so that the cone 3 is held in the sleeve 1 safe from being lost, even if it is not held by the screw 2 in the sleeve 1. The cone 3 is guarded against sliding into the sleeve 1 by its frusto-conical section 16. Furthermore, a safety device to prevent twisting of the expanding cone 3 relative to the expanding sleeve 1 is created by the abutment 21 slidable in the slot 4, since only if any such twisting relative to each other is excluded, the expanding cone 3 can be pulled into the sleeve 1 when the screw 2 is twisted relative to the sleeve 1.

Between the abutment 21 and the frusto-conical section 16 an interlocking 23 of the two edges 18, 19, i.e. of the wall 14 in the vicinity of its joint gap 17, is provided in the cylindrical section 15. This interlocking 23 consists of a dove-tailed cut-out recess 24 in the vicinity of the edge 19 and a projection 25 adjusted in cross-section, i.e. equally dove-tailed and cut-out, which engages with the recess 24 positively and free of clearance. Any opening of the expanding cone 3 radially to the axis 5 and tangentially to its circumference is thus excluded.

Furthermore, any axial torsion of the cone 3 due to longitudinal displacement of the edges 18, 19 relative to each other in the direction of the axis 5 is excluded.

In the vicinity of this interlocking 23 an internal thread 26 is provided serving to take the external thread 11 of the screw 2. To take up this internal thread 26 the wall 14 of the cone 3 is provided with a narrowing 27 which extends over the axial extension of the internal thread 26 and of which the depth f is smaller than the thickness a of the wall 14, but larger than half the thickness a/2. The depth f of this narrowing 27 is in any case dimensioned such that in each case the thread root 28 of the internal thread 26 is located radially within the inner side 29 of the wall 14 in the cylindrical section 15, so that the bolt 10 can be introduced with the external thread 11 through the cylindrical section 15. On the other hand, sufficient material must be available in the wall 14 for the formation of the internal thread 26. Concerning this it is emphasized that the internal thread 26 is produced chiplessly by stamping or the like, i.e. by a flow forming of the sheet in this area.

Figure 2:
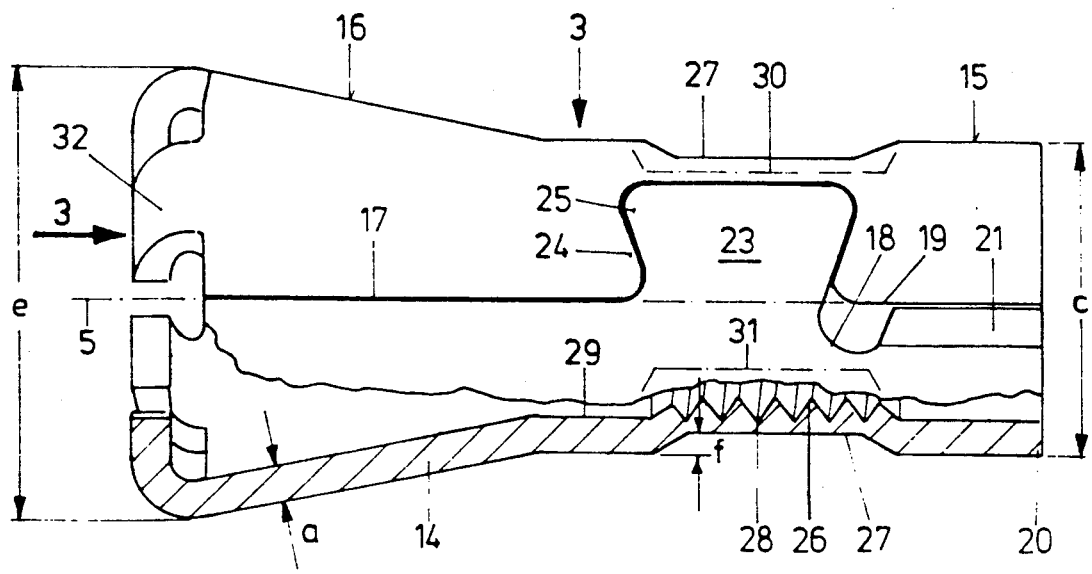
FIG. 2 is a longitudinal top view partially broken up of the expanding cone of the expanding plug on a larger scale.
Figure 3:
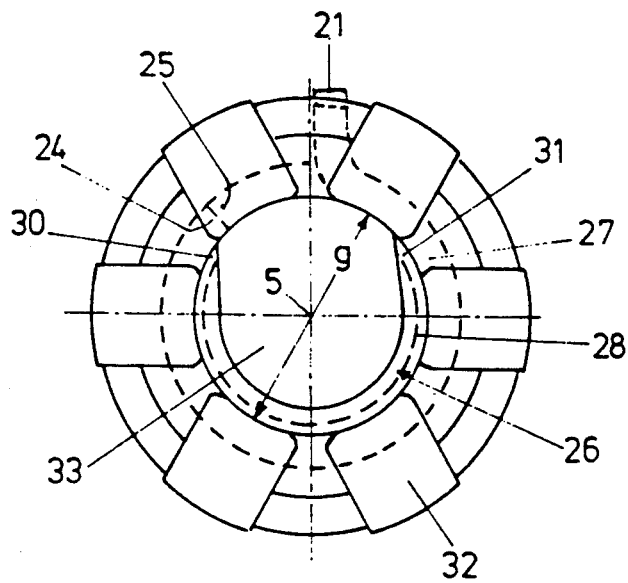
FIG. 3 is a front view of the expanding cone along the arrow 3 in FIG. 2.

The narrowing 27 and thus the internal thread 26 do not extend over the total inner circumference of the cylindrical section 15 of the expanding cone 3, but—as indicated in FIGS. 2 and 3—only over an area of about 250° to 270°. It tapers off into the wall 14 in two end zones 30, 31, namely ahead of the in each case associated edges 18, 19. This means that the narrowing 27 and thus the internal thread 26 ends ahead of the edge 19 associated with the bottom of the recess 24 and ahead of the edge 18 associated with the abutment 21. Thus, there is not internal thread provided in the interlocking 23, i.e. in particular in the projection 25. This embodiment serves to ensure that the internal thread 26 has a course exactly corresponding to that of the external thread 11. Since the internal thread 26 is formed chiplessly prior to the expanding cone 3 being bent together, inaccuracies in axial alignment of the threads at the joint would result in that the screw 2 could no longer be screwed in with its external thread 11. Furthermore, the interlocking 23 serves to ensure that precisely in this area after the cone 3 has been bent together from the punched sheet blank the threads of the internal thread 26 have a very exact path relative to each other, which remains as exact for the above-mentioned reasons. Should it be necessary in an individual case, the interlocking 23 may be additionally secured by a welding point, i.e. without the addition of foreign matter during welding; but as a rule this will not be necessary.

As can be seen from FIG. 3 in connection with FIG. 2 and the above description, the inner radius of the cylindrical section 15 is larger than the outer radius of the external thread 11 in the area between the end zones 30, 31, so that the external thread 11 does not touch the wall 14 here.

At the end of the frusto-conical section 16 located outside the expanding sleeve 1 tongues 32 bent radially inwards, i.e. towards the axis 5, are provided which limit a front end opening 33 of the cone 3, of which the diameter g approximately corresponds to the outer radius of the external thread 11 of the screw 2, so that, when the cone 3 is pulled into the sleeve 1, the cone 3 is once again and additionally centered relative to the bolt 10 of the screw 2 when it passes through the opening 33.

Figure 4:
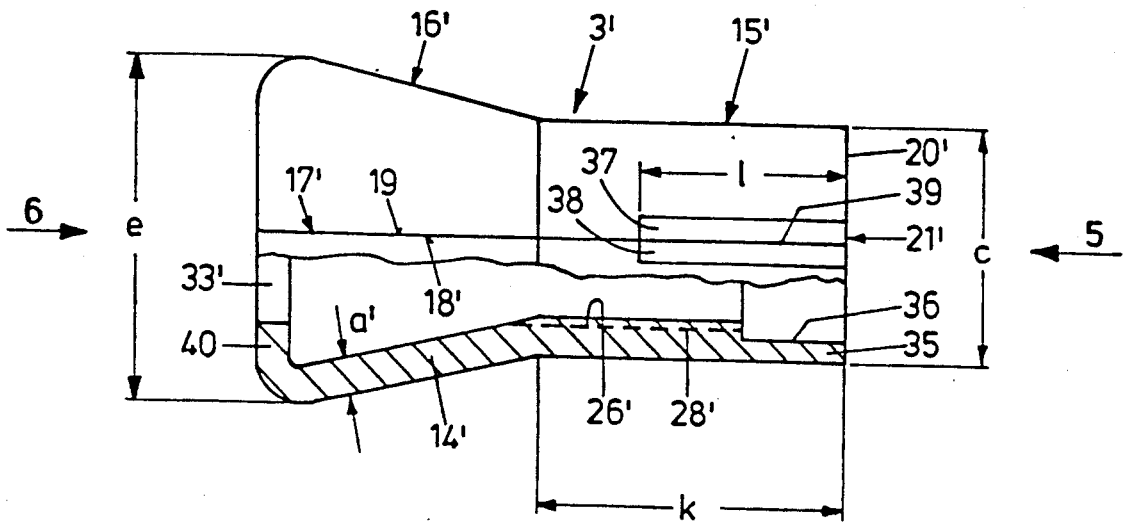
FIG. 4 is a longitudinal top view partially broken up of a further example of the expanding cone on an extremely enlarged scale.
Figure 6:
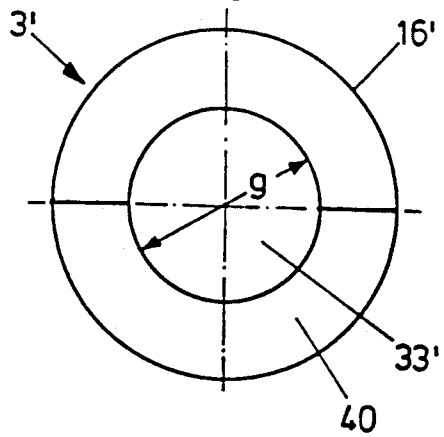
FIG. 6 is a front view of the expanding cone along the arrow 6 in FIG. 2.
Figure 5:
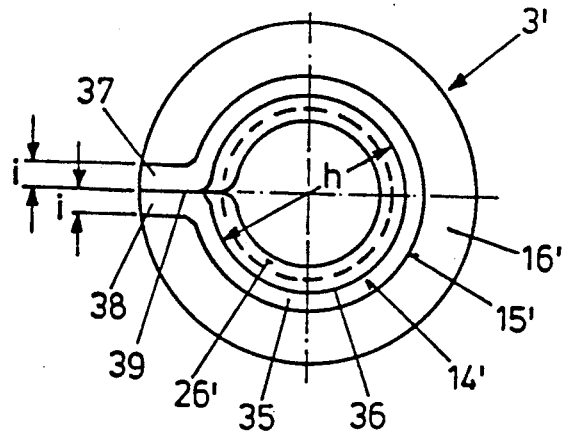
FIG. 5 is a front view of the expanding cone along the arrow 5 in FIG. 2.

A further exemplary embodiment of an expanding cone 3' is shown in FIGS. 4 to 6. As far as parts are concerned that are similar in construction and identical in function, the same reference numerals are used as in FIGS. 1 to 3 marked with a prime. A special description is not necessary; reference is made to the foregoing description.

A tapered section 35 is formed in the vicinity of the free end 20' of the cone 3'. This section 35 is followed by an internal thread 26' serving to receive the external thread 11 of the screw 2. The interior diameter h of the cylindrical inner surface 36 of the tapered section 35 is in any case dimensioned such that the root 28' of the internal thread 26' lies within this inner surface 36, so that the bolt 10 with the external thread 11 can be introduced through the cylindrical section 15'. On the other hand, sufficient material must be available in the wall 14' for the forming of the internal thread 26'.

The abutment 21' is formed by two flaps or flags 37, 38 bent radially outwards from the edges 18', 19' towards the axis 5, where they rest one against the other. Their thickness i is smaller than the thickness a' of the wall 14' of the cone 3'. $0.8\,a' \geq i \geq 0.5\,a'$ applies. As can be seen from the drawing, the flaps 37, 38 extend from the free end 20' of the cylindrical section 15' over between a half to three quarters of the length k of the cylindrical section 15'. In any case they clearly still extend over the area of the internal thread 26'. Therefore, $0.75\,k \geq 1 \geq 0.5\,k$ is true for the length l of the flaps 37, 38. At their joint 39 the two flaps or flags 37, 38 are connected with each other by welding, in particular by butt welding, from which results the rigidity of the expanding cone 3'. As can further be seen from the drawing, the flaps or flags 37, 38 extend as far as the exterior diameter e of the frusto-conical section 16'.

At the end of the frusto-conical section 16' located outside the expanding sleeve 1 a rim 40 is provided, which extends radially inwards, i.e. towards the axis 5 and which defines an opening 33' at the front of the cone 3'. The diameter g of this opening 33' about corresponds to the exterior diameter of the external thread 11 of the screw 2, so that when drawn into the sleeve 1 the cone 3' is once again and additionally centered relative to the bolt 10 of the screw 2 when the latter penetrates the opening 33'.

After being punched out this expanding cone 3' is deformed by deep drawing to represent two integrally joined semi-expanding-cones, which are connected with one another diametrically in relation to or between the edges 18', 19'. During this deep drawing process also the tapered section 35 is formed by a corresponding displacement of material. Proceeding from the thickness a' of the wall 14' the flaps or flags 37, 38, too, are deformed by a corresponding displacement of material to assume the thickness i. Subsequently, these two halves are bent towards each other thus assuming the above-described shape shown in the drawing. Then the two flaps 37, 38 are welded together at their joint 39. Finally, the internal thread 26' is cut. Welding only takes place between the flaps or flags 37, 38, i.e. it does not take place in the vicinity of the joint gap 17' extending to the rim 40.

What is claimed is:

1. An expanding plug comprising:
   an expanding sleeve (1) provided at least over part of its length with at least one slot (4), having a central longitudinal axis (5) and having a first end with a rim (8) and a second end opposite said first end, said second end being a plug-in end (6);
   an expanding screw (2) having a head (12) at one end and an external thread (11) at another end and arranged in the expanding sleeve (1) concentrically to said central longitudinal axis (5) and said head (12) bearing against said rim (8); and an expanding cone (3,3') provided with an internal thread (26,26') taking up said external thread (11) of the expanding screw (2), and with an expanding section (16,16') and arranged in the plug-in end (6) in an untwistable manner with respect to the expanding sleeve (1) and expanding said expanding sleeve (1) when being pulled into the expanding sleeve (1) by means of the expanding screw (2);

wherein the expanding cone (3,3') consists of a bent metal sheet having a wall (14,14') with a first edge (18,18') and a second edge (19,19') limiting a joint gap (17,17') and wherein said first edge (18,18') and said second edge (19,19') are tightly connected with each other in the direction of said central longitudinal axis (5) and tangentially to it.

2. An expanding plug according to claim 1, wherein said first edge (18) and said second edge (19) are positively connected with each other by means of an interlocking (23).

3. An expanding plug according to claim 2, wherein said interlocking (23) is formed by a projection (25) associated with said first edge (18) and by a cut-out recess (24) associated with said second edge (19), said projection (25) positively engaging with said cut-out recess (24).

4. An expanding plug according to claim 2, wherein said internal thread (26) is arranged in the vicinity of said interlocking (23).

5. An expanding plug according to claim 1, wherein said internal thread (26) extends only over part of the circumference of the expanding cone (3), and adjacent to said first edge (18) and said second edge (19) being areas, which are provided without any thread.

6. An expanding plug according to claim 2, wherein said internal thread (26) does not extend over said interlocking (23).

7. An expanding plug according to claim 1, wherein said internal thread (26) is provided in a narrowing (27) in said wall (14) of the expanding cone (3).

8. An expanding plug according to claim 5, wherein said internal thread (26) is provided in a narrowing (27) in said wall (14) of the expanding cone (3) and wherein said narrowing (27) extends approximately over the circumferential area of the internal thread (26).

9. An expanding plug according to claim 2, wherein in addition to the expanding section (16) the expanding cone (3) has a contiguous cylindrical section (15) where said interlocking (23) is provided.

10. An expanding plug according to claim 1, wherein as a safety device to prevent any twisting of the expanding cone (3) relative to the expanding sleeve (1) an abutment (21) protruding into said slot (4) of the expanding sleeve (1) is bent radially outwards relative to the central longitudinal axis (5) from one of said first and said second edges (18, 19).

11. An expanding plug according to claim 10, wherein said abutment (21) is arranged behind at least one projection (22) protruding into said slot (4) and provided on the expanding sleeve (1) to form a safety device to prevent loss between the expanding sleeve (1) and the expanding cone (3).

12. An expanding plug according to claim 1, wherein at a free end of the expanding section (16) tongues (32) bent radially inwards towards the central longitudinal axis (5) are provided which limit a centring opening (33) for the expanding screw (2).

13. An expanding plug according to claim 1, wherein, in the vicinity of a cylindrical section (15') receiving the internal thread (26'), flaps (37, 38) are deflected radially relative to the axis (5) outwards from both edges (18', 19') defining the joint gap (17'), which flaps (37, 38) are connected with each other at a joint (39) to form an abutment (21) projecting into a slot (4) of the expanding sleeve (1) and serving as a safety device to prevent any twisting relative to the latter.

14. An expanding plug according to claim 13, wherein a tapered section (35) is formed between a free end (20') of the cylindrical section (15') and the internal thread (26') having a thread root (28'), the thread root (28') of the internal thread (26') lying within an approximately cylindrical inner surface (36) of the tapered section (35).

15. An expanding plug according to claim 14, wherein the abutment (21') extends over at least part of the length of the tapered section (35) and the internal thread (26').

16. An expanding plug according to claim 13, wherein $0.75\,k \geq 1 \geq 0.5\,k$ applies to the length (l) of the abutment (21') in relation to the length (k) of the cylindrical section (15').

17. An expanding plug according to claim 13, wherein $0.8\,a' \geq i \geq 0.5\,a'$ applies to the thickness (i) of the flaps (37, 38) in relation to the thickness (a') of the wall (14').

18. An expanding plug according to claim 13, wherein the abutment (21') is arranged behind at least one projection (22) provided on the expanding sleeve (1) and protruding into the slot (4) to form a safety device to prevent loss between the expanding sleeve (1) and the expanding cone (3').

19. An expanding plug according to claim 13, wherein, at a free end of the expanding section (16'), a rim (40) is formed, which is bent radially inwards towards the central longitudinal axis (5) and which defines a centring opening (33') for the expanding screw (2).

20. An expanding plug comprising:

an expanding sleeve (1) provided at least over part of its length with at least one slot (4), having a central longitudinal axis (5) and having a first end with a rim (8) and a second end opposite said first end, said second end being a plug-in end (6);

an expanding screw (2) having a head (12) at one end and an external thread (11) at another end and arranged in the expanding sleeve (1) concentrically to said central longitudinal axis (5) and said head (12) bearing against said rim (8); and an expanding cone (3, 3') provided with an internal thread (26, 26') taking up said external thread (11) of the expanding screw (2), and with an expanding section (16, 16') and arranged in the plug-in end (6) in an untwistable manner with respect to the expanding sleeve (1) and expanding said expanding sleeve (1) when being pulled into the expanding sleeve (1) by means of the expanding screw (2);

wherein the expanding cone (3, 3') consists of a bent metal sheet having a wall (14, 14') with a first edge (18, 18') and a second edge (19, 19') limiting a joint gap (17, 17') and wherein said first edge (18, 18') and said second edge (19, 19') are tightly connected with each other in the direction of said central longitudinal axis (5) and tangentially to it;

wherein, in the vicinity of a cylindrical section (15') receiving the internal thread (26'), flaps (37, 38) are deflected radially relative to the axis (5) outwards from both edges (18', 19') defining the joint gap (17'), which flaps (37, 38) are connected with each other at a joint (39) to form an abutment (21) projecting into a slot (4) of the expanding sleeve (1) and serving as a safety device to prevent any twisting relative to the latter;

wherein, the flaps (37, 38) are welded together at their joint (39).

21. An expanding plug according to claim 20, wherein the abutment (21') is arranged behind at least one projection (22) provided on the expanding sleeve (1) and protruding into the slot (4) to form a safety device to prevent loss between the expanding sleeve (1) and the expanding cone (3').

22. An expanding plug according to claim 20, wherein a tapered section (35) is formed between a free end (20') of the cylindrical section (15') and the internal thread (26') having a thread root (28'), the thread root (28') of the internal thread (26') lying within an approximately cylindrical inner surface (36) of the tapered section (35).

23. An expanding plug according to claim 20, wherein the abutment (21') extends over at least part of the length of the tapered section (35) and the internal thread (26').

24. An expanding plug according to claim 20, wherein $0.75\ k \geq l \geq 0.5\ k$ applies to the length (l) of the abutment (21') in relation to the length (k) of the cylindrical section (15').

25. An expanding plug according to claim 20, wherein $0.8\ a' \geq i \geq 0.5\ a'$ applies to the thickness (i) of the flaps (37, 38) in relation to the thickness (a') of the wall (14').

26. An expanding plug according to claim 20, wherein, at a free end of the expanding section (16'), a rim (40) is formed, which is bent radially inwards towards the central longitudinal axis (5) and which defines a central opening (33') for the expanding screw (2).

* * * * *